United States Patent [19]

Martin

[11] Patent Number: 5,074,333

[45] Date of Patent: Dec. 24, 1991

[54] ADJUSTMENT OR REGULATION VALVE

[75] Inventor: Roger Martin, St Cyr, France

[73] Assignee: VANATOME Societe Anonyme, Annonay, France

[21] Appl. No.: 586,336

[22] Filed: Sep. 17, 1990

Related U.S. Application Data

[63] Continuation of Ser. No. 361,048, Jun. 5, 1989, abandoned.

[30] Foreign Application Priority Data

Jun. 3, 1988 [FR] France ............................ 88 07872

[51] Int. Cl.$^5$ ............................................. F16K 3/08
[52] U.S. Cl. ............................ 137/625.3; 137/625.31; 251/208
[58] Field of Search ........................... 251/208, 205; 137/625.3, 625.31

[56] References Cited

U.S. PATENT DOCUMENTS

| | | | |
|---|---|---|---|
| 1,238,433 | 8/1917 | Pedersen | 251/208 X |
| 1,271,359 | 7/1918 | Price | 251/208 X |
| 3,026,899 | 3/1962 | Mischanski | 137/625.31 X |
| 4,440,382 | 4/1984 | Pruvot | 251/208 X |
| 4,674,537 | 6/1987 | Bergemann | 251/208 X |

FOREIGN PATENT DOCUMENTS

| | | | |
|---|---|---|---|
| 83891 | 8/1920 | Fed. Rep. of Germany | 137/625.31 |
| 0008575 | 1/1980 | Japan | 251/208 |

Primary Examiner—Arnold Rosenthal
Attorney, Agent, or Firm—Browdy and Neimark

[57] ABSTRACT

The valve includes one or two perforated seals having flat surfaces that can move in translation or rotation in their plane, placed between two fixed parts provided with passages for the fluid, which flows in direction perpendicular to the plane of the seals. The seals are composed of two disks turning in opposite ways around a common shaft and including multiple perforations. The passages in the two fixed elements are composed of multiple channels each having a relatively small section. The flow is regulated by moving the seals to change the number of channels which are opened or closed. The value can be used for adjustment or regulation of fluid flow and/or pressure.

14 Claims, 2 Drawing Sheets

ADJUSTMENT OR REGULATION VALVE

This application is a continuation of application Ser. No. 07/361,048, filed June 5, 1989 now abandoned.

BACKGROUND OF THE INVENTION

1. Field of the Invention

The present invention pertains to an adjustment or regulation valve for fluid pressure and/or flow. More specifically, the present invention pertains to a valve of the type comprising at least one perforated seal with flat surfaces that can be moved in translation or rotation in its plane under the action of the control mechanism, the fluid flowing only in one general direction perpendicular to the plane of the seal(s).

2. The Prior Art

Valves are known whose seals are composed of a perforated element in the shape of a disk, drum or sector, mounted to turn around its axis under the action of outside control mechanisms and placed between two fixed elements, each having at least one passage for the fluid. In this type of valve, the alignment of the perforations of the turning element with the passages of the fixed elements located on both sides of the turning element allows the fluid to circulate. Conversely, if the perforations of the turning element are not aligned with the passages of the fixed elements, the circulation of the fluid is interrupted. Valves of this type have been described, for example, in the following French Patents: 1,235,296, 2,512,513, 2,542,843, and 2,563,602. In particular, French Patent 2,512,513 discloses a valve having a seal plate in the form of a circle sector, mounted to turn around its shaft, which is parallel to the axis of the passages defined by the fixed elements, and offset laterally from the axis of said passages.

All of these known valves still involve disadvantages or shortcomings. Most of them are designed only as valves having an open and closed position, and not allowing continuous flow adjustment between a maximum open and closed position, with infinite intermediary positions. Some valves are actually designed as adjustment or regulation valves (for example, see French Patent 2,563,602), but they use passages having a relatively large sections simultaneously blocked to a greater of lesser extent by the mobile perforated element forming the seal; in this way, during operation, the latter valves are subject to undesirable phenomena: perturbations of the flow of liquid with lowered pressure and instability in the seal area, excentration or asymmetry of said flow, and considerable noise.

SUMMARY OF THE INVENTION

The present invention aims to eliminate all these problems by providing an adjustment or regulation valve wherein the progressive variation of the cross section for fluid passage is obtained without disrupting the flow of the fluid, which remains stable and can be kept centered or symmetrical, this valve operating with minimal amount of noise.

For this purpose, the invention substantially has as an object an adjustment or regulation valve of the type stipulated above, wherein the (each) seal comprises multiple perforations, and wherein the passages placed in the two fixed elements located on both sides of the seals are composed of multiple channels, each having a relatively small section, with the perforations and channels being arranged so that the movement of the seal(s) changes the number of blocked or open channels.

Thus, unlike current valves, the flow is modified in the valve covered by this invention by changing the number of channels, which are small and numerous, through which the liquid passes, rather than by changing the useful passage section of one or several channels. In other terms, in the case of the invention, each channel is opened or blocked according to the position of the seals, and when a channel is not blocked, its useful section corresponds to its total section and the fluid running through it meets no obstacles to disturb its flow.

The adjustment or regulation valve according to the invention preferably has two seals comprising perforations in corresponding arrangements, which can be moved in opposite ways through the action of the control mechanism. Both seals can be composed especially of two perforated circle sectors or disks, attached and mounted to turn around the same shaft, control mechanisms being arranged to control the rotation of said two disks or sectors simultaneously in opposite directions. In this way, regardless of the degree to which the valve is opened, the flow is always properly centered and symmetrical.

The multiple perforations of the seals can be in the form of small circular holes or oblong openings, and more particularly, openings arranged in concentric circle arcs centered on the axis of the seal(s), in the case of at least one rotating seal.

In one simple embodiment, multiple channels of the two fixed elements located on both side of the seal(s) are parallel to each other and to the general direction in which the liquid is flowing.

When there is at least one rotating seal, the multiple channels of the two fixed elements are preferably arranged in circle arcs centered on the rotation shaft of the seal(s). Said channels can also be distributed in lines radiating from the rotation shaft of the seal(s).

According to another characteristic of the invention that contributes to the uniformity of the flow, the two fixed elements located on both sides of the seal(s) have profiled concave parts on the side farthest from the seal(s), with the multiple channels of said two fixed elements issuing into said concave parts.

BRIEF DESCRIPTION OF THE DRAWINGS

In any event, the invention will be more clearly understood through the description that follows, in reference to the attached schematic drawings showing one embodiment of this adjustment or regulation valve as a non-restrictive example, in which.

DETAILED DESCRIPTION OF THE PREFERRED EMBODIMENT

Figure 1:
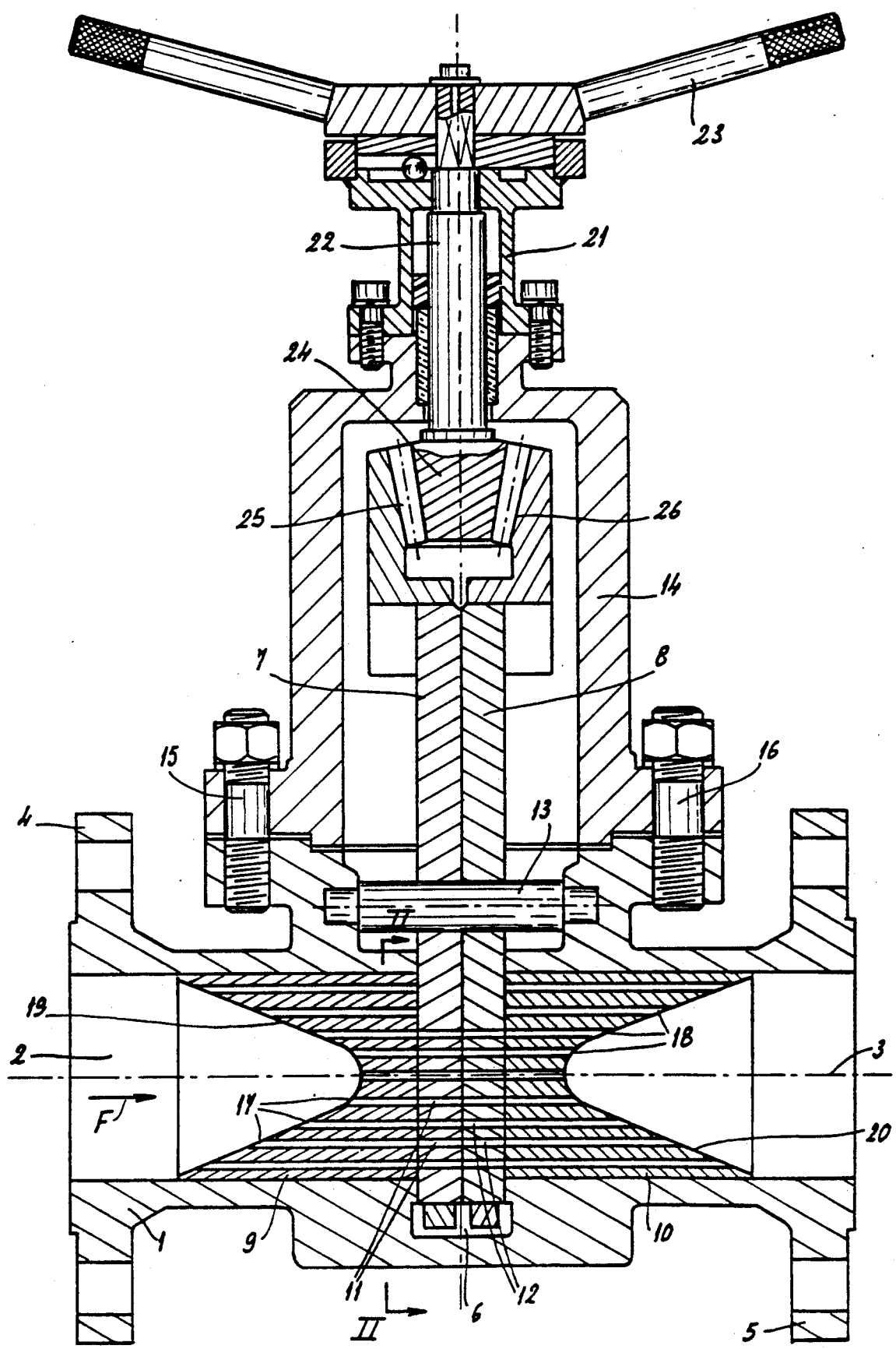
FIG. 1 is a cross section view through the axis of a valve according to the invention, whose seals are composed of two rotating perforated disks.

The adjustment or regulation valve shown overall in FIG. 1 comprises a tubular body 1 defining a main conduit having circular section and an axis 3. Body 1 may comprise attachment or connection flanges at its two ends, respectively 4 and 5. The center part of body 1 forms a cavity 6 accommodating two attached seals 7 and 8, which are placed between two fixed parts, respectively 9 and 10, mounted in body 1 inside conduit 2.

The two seals are composed here of two disks 7 and 8, each endowed with a series of perforations, respectively 11 and 12, whose arrangement will be stipulated below. The two disks 7 and 8, having the same diameter, are mounted to turn around the same shaft 13, which is parallel to axis 3 of the main conduit 2 located on the side of said conduit 2. Thus, only a limited part of the two perforated rotating disks 7 and 8 communicates with conduit 2 and with the section of body 1. The remainder of the two disks 7 and 8 is lodged inside a housing 14 attached to body 1 using bolts 15, 16, projecting laterally from said body 1.

Figure 2:
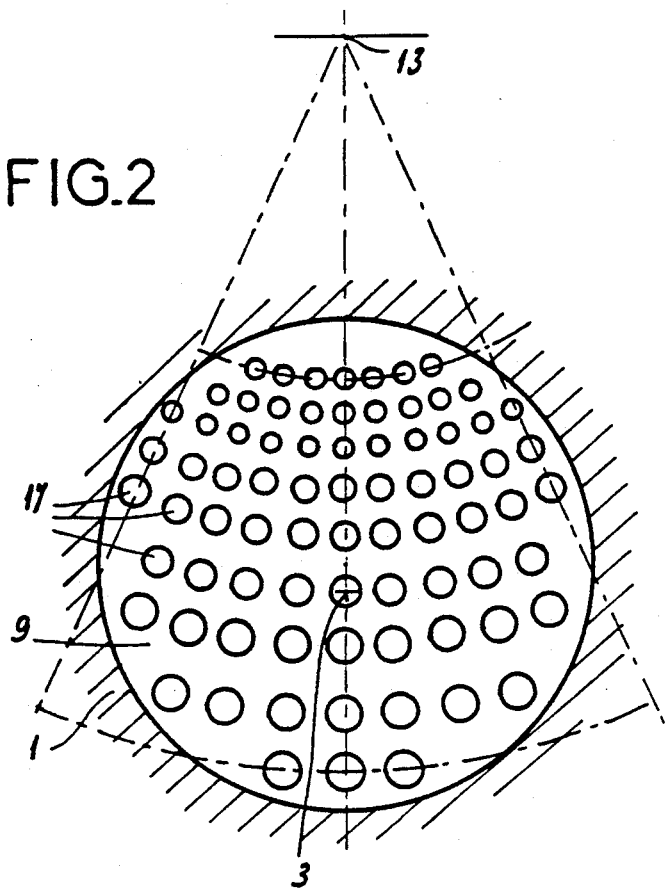
FIG. 2 is a cross section view along II—II in FIG. 1, showing the arrangement of the channels in the fixed elements.

The two fixed parts 9 and 10 placed symmetrically on both sides of the two perforated rotating disks 7 and 8 each comprise multiple channels, respectively 17 and 18, each having a small section, and which are all parallel to each other and to axis 3 of main conduit 2. Each of the two fixed parts 9 and 10 includes, on its side farthest from disks 7 and 8, a profiled concave part having a convergent or divergent aspect, respectively 19 and 20, into Which the channels, respectively 17 and 18, issue. FIG. 2 shows a possible arrangement for the channels 17 of fixed part 9 (with the arrangement being the same for the channels 18 in the other fixed part 10). Considering fixed part 9 seen in a transverse cut, channels 17 are arranged in a series of circle arcs with increasing radii, all centered on the common rotation axis 13 of the two disks 7 and 8. Moreover, channels 17 are distributed over lines radiating from said rotation shaft 13.

Housing 14 is provided with control means to rotate the two perforated rotating disks 7 and 8. Said means comprise a bearing 21 in which a drive shaft 22 is mounted to turn, perpendicular to axes 3 and 13. At its outside end, shaft 22 holds a control wheel 23 and, at its inside end, it holds a drive pinion 24. The two disks 7 and 8 each comprise teeth, respectively 25 and 26, on at least part of their periphery, said teeth being engaged with the same drive pinion 24. Thus, the adjustment of wheel 23 turns the two disks 7 and 8 simultaneously in opposite directions around their common shaft 13 through the intermediary of drive pinion 24.

Figure 3:
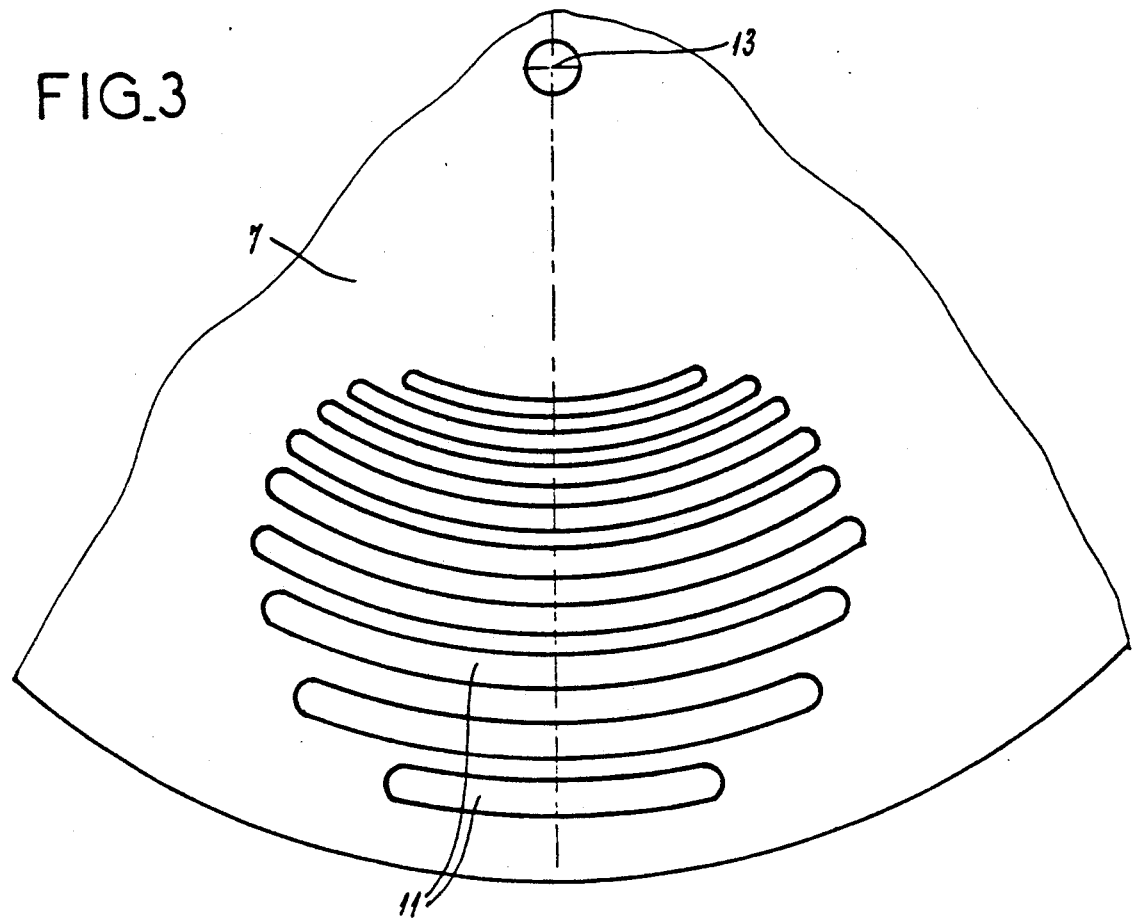
FIG. 3 is a partial surface view of a rotating seal of the valve in FIG. 1.

The operation of the valve requires a special arrangement of perforations 11 and 12 of the two rotating disks 7 and 8. One possible arrangement is illustrated in FIG. 3, for perforations 11 of disk 7 (with the arrangement being the same for perforations 12 of the other disk 8); said perforations are composed of elongated openings 11 arranged in one zone of disk 7 in concentric circle arcs centered on the rotation shaft 13 of seal 7 under consideration. The increasing radii or the circle arcs in which openings 11 are arranged correspond to the circle arc radii in which respective channels 17 and 18 of the two attached parts 9 and 10 are arranged. Thus, each opening 11 or 12 can communicate with a number of channels 17 and 18.

Assuming that the fluid enters from the left flange 4 side, the fluid can flow in the general direction of arrow F, inside conduit 2. Depending on the angular positions occupied by the two disks 7 and 8, their respective openings 11 and 12 communicate to a greater or lesser extent with each other and with the outlets of channels 17 and 18 placed in the two fixed parts 9 and 10. More specifically, according to the angular positions of disks 7 and 8, a greater or smaller number of channels 17 and 18 are blocked or unblocked. Thus, the total flow of fluid entering conduit 2 of the valve is divided into a number of partial flows running through channels 17 and 18 being released at a given moment, and the total allowed flow is greater or smaller depending on the number of channels 17 and 18 released. Of course, disks 7 and 8 can also occupy a specific angular position wherein they block the outlets of all channels 17 and 18, to give the valve a closed position.

It is understood that the form and arrangement of perforations 11 or 12 in disks 7 and 8 shown in FIG. 3 is non-restrictive, and the operating principle described above can also be obtained with perforations which, instead of having the form of openings in circle arcs centered on shaft 13 of respective disks 7 and 8, would be in the form of small circular holes, for example, distributed in concentric circles.

Of course, and as the above demonstrates, the invention is not limited solely to the embodiment of this adjustment or regulation valve described above as an example; on the contrary, it encompasses all the different embodiments and applications according to the same principle. In particular, the following can be done without departing from the scope of the invention:

making rotating seals in the form of circle sectors instead of complete disks;

using seals composed of two perforated plates that are attached and can move in translation in the same direction but in opposite ways, instead of perforated rotating sectors or disks;

by providing only one seal that can be moved in translation or rotation; and/or by using any equivalents of the means described, especially pertaining to the control mechanism for the operation of the seal(s); said means can be manual or motorized.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A valve for adjusting or regulating fluid flow and/or pressure comprising:
at least one seal having flat surfaces, that can be moved i its plane, said seal having a multiplicity of small fluid flow openings extending therethrough;
two fixed elements disposed on either side of said at least one seal, each provided with a multiplicity of small passages through which the fluid is adapted to flow in a direction perpendicular to the plane of said at least one seal, said passages defining multiple channels each having a relatively small section;
means for completely closing some of said multiple channels while keeping others of said multiple channels completely open, said means comprising (1) an arrangement of said multiple channels and said multiplicity of fluid flow openings whereby movement of said seal causes complete covering of some of said multiple channels while leaving others completely uncovered, and (2) a control mechanism for controlling the movement in its plane of said seal.

2. A valve for adjusting or regulating fluid flow and/or pressure comprising:
   at least one perforated seal having flat surfaces, that can be moved in its plane;
   two fixed elements disposed one on either side of said at least one seal, each provided with a plurality of passages through which the fluid is adapted to flow in a direction perpendicular to the plane of said at least one seal;
   a control mechanism for controlling the movement of said at least one perforated seal;
   wherein each of said at least one seal comprises a plurality of perforations and wherein said plurality of passages in the two fixed elements located on both sides of the at least one seal are composed of multiple channels, each having relatively small section, with the perforations and channels being arranged such that the movement of the at least one seal changes the number of channels which are covered or uncovered;
   wherein said at least one seal comprises two seals comprising perforations having corresponding arrangements, and means for moving said seals in opposite directions with respect to each other under the action of said control mechanism.

3. The adjustment or regulation valve according to claim 2, wherein said two seals are composed of two perforated disks or circle sectors attached and mounted to turn around a common shaft, and said control mechanism being arranged so as to control the rotation of said two disks or sectors simultaneously and in opposite directions with respect to each other.

4. The adjustment or regulation valve according to claim 3, wherein said two seals in the shape of perforated disks or circle sectors comprise teeth on their respective peripheries thereof engaged in a common drive pinion, and said control mechanism being designed to cause the two seals to turn simultaneously in opposite directions with respect to each other around their common shaft through the intermediary of the drive pinion.

5. The adjustment or regulation valve according to claim 1, wherein said at least one perforation of the at least one seal comprises multiple perforations in the form of small circular holes.

6. The adjustment or regulation valve according to claim 1, wherein said at least one perforation in the at least one seal comprises multiple perforations in the form of oblong openings.

7. A valve for adjusting or regulating fluid flow and/or pressure comprising:
   at least one perforated seal having flat surfaces, that can be moved in its plane;
   two fixed elements disposed one on either side of said at least one seal, each provided with a plurality of passages through which the fluid is adapted to flow in a direction perpendicular to the plane of said at least one seal;
   a control mechanism for controlling the movement of said at least one perforated seal;
   wherein each of said at least one seal comprises a plurality of perforations and wherein said plurality of passages in the two fixed elements located on both sides of the at least one seal are composed of multiple channels, each having relatively small section, with the perforations and channels being arranged such that the movement of the at least one seal changes the number of channels which are covered or uncovered during flow and said number is greater than zero;
   wherein said perforations in the at least one seal are oblong openings placed in concentric circle arcs, centered on the rotating shaft of the at least one seal.

8. The adjustment or regulation valve according to claim 1, wherein said multiple channels in the fixed elements located on both sides of the at least one seal are parallel to each other and the general direction (F) in which the liquid is flowing.

9. The adjustment or regulation valve according to claim 8, wherein said multiple channels of the two fixed elements located on both sides of the at least one seal are placed in circle arcs centered around the rotation shaft of said at least one seal.

10. The adjustment or regulation valve according to claim 9, wherein said multiple channels of the two fixed elements are distributed in lines radiating from the rotation shaft of said at least one seal.

11. A valve for adjusting or regulating fluid flow and/or pressure comprising:
    at least one perforated seal having flat surfaces, that can be moved in its plane;
    two fixed elements disposed one on either side of said at least one seal, each provided with a plurality of passages through which the fluid is adapted to flow in a direction perpendicular to the plane of said at least one seal;
    a control mechanism for controlling the movement of said at least one perforated seal;
    wherein each of said at least one seal comprises a plurality of perforations and wherein said plurality of passages in the two fixed elements located on both sides of the at least one seal are composed of multiple channels, each having relatively small section, with the perforations and channels being arranged such that the movement of the at least one seal changes the number of channels which are covered or uncovered;
    wherein said two fixed elements located on both sides of said at least one seal having profiled concave parts on the side farthest from said at least one seal, with the multiple channels of said two fixed elements issuing into said concave parts.

12. The adjustment or regulation valve according to claim 2, wherein said at least one seal is composed of two perforated plates that can move in translation but in the opposite direction with respect to each other.

13. The adjustment or regulation valve according to claim 1 wherein the flow through said valve is not interrupted by the changing of the number of channels.

14. The adjustment or regulation valve of claim 13 wherein one channel is opened or closed at a time.

* * * * *